United States Patent [19]

Kawamoto et al.

[11] Patent Number: 5,551,045
[45] Date of Patent: Aug. 27, 1996

[54] MICROPROCESSOR WITH RESET EXECUTION FROM AN ARBITRARY ADDRESS

[75] Inventors: Kohji Kawamoto; Yukihiko Shimazu; Toshiki Fujiyama, all of Itami, Japan

[73] Assignee: Mitsubishi Denki Kabushiki Kaisha, Japan

[21] Appl. No.: 245,985

[22] Filed: May 18, 1994

Related U.S. Application Data

[63] Continuation of Ser. No. 966,123, Oct. 22, 1992, Pat. No. 5,361,371, which is a continuation of Ser. No. 450,358, Dec. 13, 1989, abandoned.

[30] Foreign Application Priority Data

Dec. 21, 1988 [JP] Japan .................................. 63-324234

[51] Int. Cl.$^6$ .................................. G06F 9/06; G06F 9/34
[52] U.S. Cl. .................................. 395/775; 395/250; 395/493; 364/DIG. 1; 364/DIG. 2
[58] Field of Search .................................. 395/800, 575, 395/200, 325, 775, 725, 275, 375, 476, 143, 145, 148, 493, 299, 485, 730, 309, 830, 298; 364/DIG. 1, DIG. 2, 724.16; 371/12; 455/180.2; 340/825.52

[56] References Cited

U.S. PATENT DOCUMENTS

| | | | |
|---|---|---|---|
| 3,958,225 | 5/1976 | Turner et al. | 395/375 |
| 4,093,922 | 6/1978 | Buss | 455/180.2 |
| 4,136,400 | 1/1979 | Caswell et al. | 395/325 |
| 4,165,534 | 8/1979 | Dummermuth et al. | 395/275 |
| 4,172,289 | 10/1979 | Struger et al. | 395/275 |
| 4,403,284 | 9/1983 | Sacarisen et al. | 395/800 |
| 4,494,196 | 1/1985 | Greer | 395/275 |
| 4,519,033 | 5/1985 | Vaughn et al. | 395/550 |
| 4,562,841 | 1/1986 | Brockway et al. | 607/29 |
| 4,574,344 | 3/1986 | Hollis et al. | 395/500 |
| 4,745,544 | 5/1988 | Renner et al. | 395/275 |
| 4,747,040 | 5/1988 | Blanset et al. | 395/650 |
| 4,799,152 | 1/1989 | Chuang et al. | 395/800 |
| 4,802,119 | 1/1989 | Heene et al. | 395/400 |
| 4,812,972 | 3/1989 | Chastain et al. | 395/375 |
| 4,853,845 | 8/1989 | Zimmer et al. | 395/550 |
| 4,868,738 | 9/1989 | Kish et al. | 395/400 |
| 4,879,648 | 11/1989 | Cochran et al. | 395/275 |
| 4,949,298 | 8/1990 | Nakanishi et al. | 395/425 |
| 4,960,982 | 10/1990 | Takahira | 235/382 |
| 5,019,970 | 5/1991 | Yamaguchi | 395/375 |
| 5,045,993 | 9/1991 | Murakami et al. | 395/375 |
| 5,101,342 | 5/1992 | Namimoto | 395/800 |

FOREIGN PATENT DOCUMENTS

62-24326  7/1987  Japan .

OTHER PUBLICATIONS

Smith, *Electronics, Circuits and Devices*, 3rd Ed.
User's Manual for High Function CMOS Digital Signal Processor, MNI 1901/1909.

*Primary Examiner*—Daniel H. Pan
*Attorney, Agent, or Firm*—Townsend and Townsend and Crew

[57] ABSTRACT

A microprocessor with a built-in instruction ROM is described. Arbitrary data is set in advance in a data register of the microprocessor. The arbitrary data is given to a program counter by a register indirect jump instruction. The microprocessor has a normal reset function and an additional reset function allowing reset from a predetermined address. The additional reset function is used when the logic level of a control signal input terminal is at a predetermined level when the reset signal to the reset terminal is cleared. The arbitrary data is transferred to the program counter by register indirect jump instruction and set in the program counter. The program is re-executed with this data as an instruction start address.

12 Claims, 11 Drawing Sheets

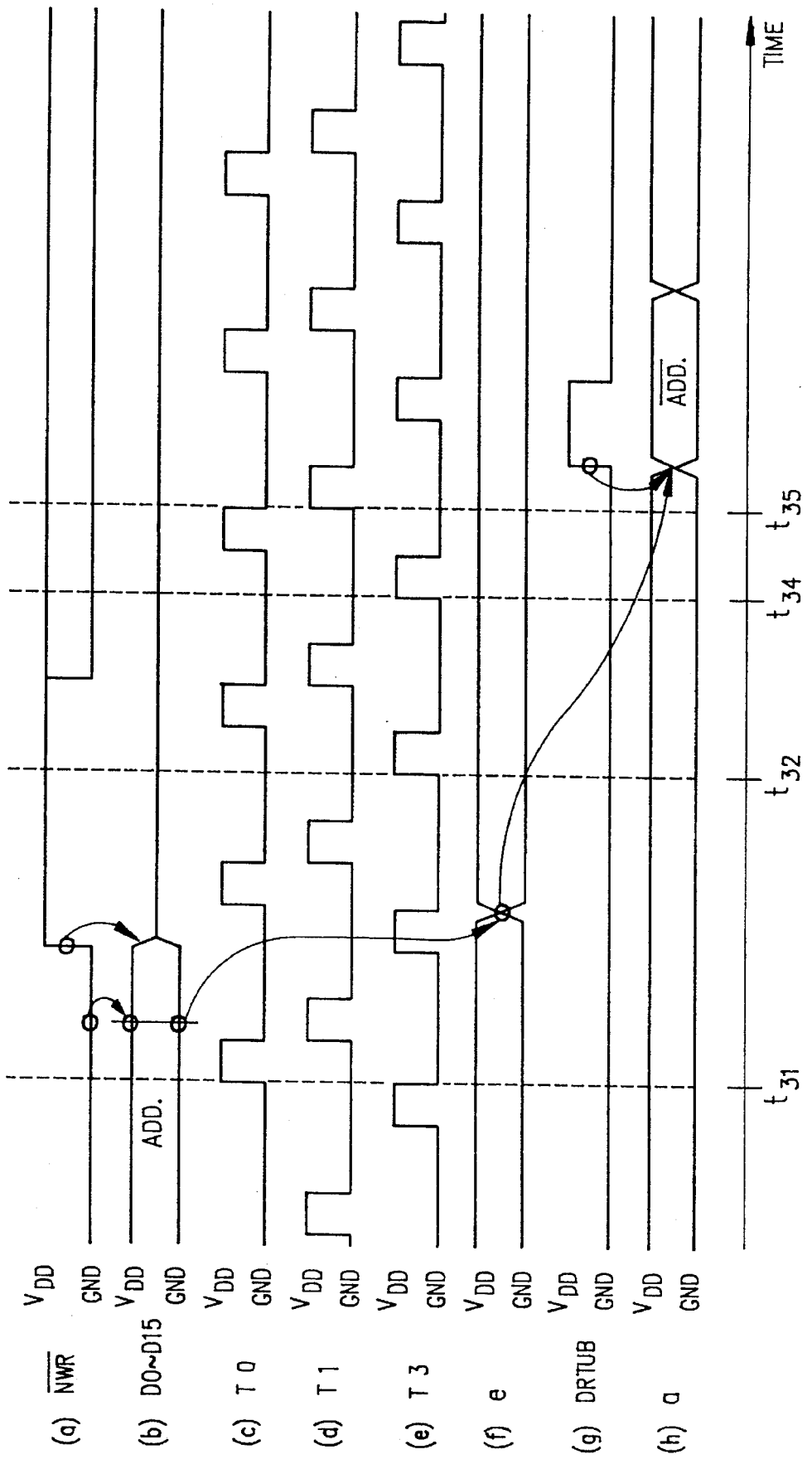

MICROPROCESSOR WITH RESET EXECUTION FROM AN ARBITRARY ADDRESS

This is a Continuation of application Ser. No. 07/966,123, now U.S. Pat. No. 5,361,371, filed Oct. 22, 1992, which is a continuation of application Ser. No. 07/450,358, filed Dec. 13, 1989, now abandoned.

BACKGROUND OF THE INVENTION

1. Field of the Invention

The present invention relates to a microprocessor with a built-in instruction ROM type, and to be further detailed, relates to a microprocessor capable of re-executing a program from an arbitrary instruction address in resetting.

2. Description of Related Art

First, description is made on the conventional microprocessor taking MN1901 as an example from "User's Manual for High-Function CMOS Digital Signal Processor MN1901/MN1909" prepared by Matsushita Denko Co., Ltd. in reference to drawings.

FIG. 1 is a block diagram showing a configuration of a major part of the above-described microprocessor MN1901.

In FIG. 1, numeral 51 designates a parallel port (data register) used for input/output of parallel data.

Input/output signals to/from this parallel port 51 are as follows. Symbols P0 to P15 designate 16-bit parallel data input/output signals. These 16-bit parallel data input/output signals are inputted or outputted through a parallel data input/output terminal 57. Symbol $\overline{PCS}$ designates a port select signal showing that data transfer can be made through the parallel port 51 when it is of low logical level (GND). Symbol $\overline{PR/W}$ designates a port read/write control signal which shows data output from the parallel port 51 when it is of high logical level ($V_{DD}$) and shows data input to the parallel port 51 when it is of low logical level (GND). Symbol $\overline{PDS}$ designates an input/output timing signal showing to perform data transfer when it is of low logical level (GND).

Numeral 52 designates an instruction memory (instruction ROM) storing instruction codes, wherein individual instructions constituting a program to be executed by this microprocessor are stored, Numeral 53 designates an instruction pointer (program counter) pointing an address to the instruction memory 52. An instruction stored in an address of the instruction memory 52 pointed by this instruction pointer 53 is outputted from the instruction memory 52.

Numeral 54 designates an instruction register, which temporarily holds the instruction outputted from the instruction memory 52, Numeral 55 designates a decoder and instruction execution unit, which decodes and executes the instruction held in the instruction register 54, Numeral 56 designates a reset control unit. A signal $\overline{RST0}$ inputted to this reset control unit 56 is a signal for resetting and starting this microprocessor when it is of low logical level (GND), and a signal $\overline{RST}$ is a reset start signal thereof.

Numerals 58 and 59 designate internal buses, and the parallel port 51 and the instruction pointer 53 are connected through these buses.

Next, description is made on operation of the conventional microprocessor having the configuration as described above.

FIG. 2 is a timing chart showing timing relation among the port select signal $\overline{PCS}$ (a) when data is written to the parallel port 51 from exterior, the port read/write control signal $\overline{PR/W}$ (b), the input/output timing signal $\overline{PDS}$(c) and the parallel data input/output signals P0 to P15(d).

First, as shown in FIG. 2(a), the port select signal $\overline{PCS}$ is turned to the low logical level (GND), arid thereby data transfer through the parallel port 51 is made possible. Next, as shown in FIG. 2(b), the port read/write control signal $\overline{PR/W}$ is turned to the low logical level (GND), and is set to the state capable of data input to the parallel port.

Thereafter, as shown in FIG. 2(c), the input/output timing signal $\overline{PDS}$ is turned temporarily to the low logical level (GND), and thereafter returned to the high logical level ($V_{DD}$), and thereby, as shown in FIG. 2(d), the parallel data P0 to P15 are written to an input data buffer (not illustrated) in the parallel port 51.

FIG. 3 is a flowchart showing a procedure of reset processing.

In FIG. 3, when the reset signal $\overline{RST0}$ to the reset control unit 56 is turned to the low logical level (GND) which is active over a period of one machine cycle or more (step S1), the signal $\overline{RST}$ which is an output of the reset control unit 56 is turned to the low logical level (GND) (step S2). Thereby, the instruction pointer 53 is reset and the content thereof is initialized to an address 0 (step S3). Accordingly, after reset has been cleared, instructions are read into the instruction register 54 in sequence from the instruction stored in the address 0 of the instruction memory 52, being executed sequentially.

FIG. 4 is a flowchart showing a procedure of a register indirect jump instruction by performing data input from the parallel port 51.

The register indirect jump instruction is executed in a manner that the parallel data P0 to P15, which is inputted from the parallel port 51 and held temporarily in a buffer memory (not illustrated) in the parallel port 51 (step S11), are transferred to the instruction pointer 53 (step S12).

Since the conventional microprocessor is constituted as described above, there has been a problem that in resetting it, the instruction pointer is reset always to the same value, and a program can be re-executed only from the fixed address of the instruction ROM wherein the program is stored.

SUMMARY OF THE INVENTION

The present invention has been achieved to eliminate the problem as described above, and the primary object thereof is to provide a microprocessor capable of resuming execution of a program from an arbitrary address of an instruction ROM by resetting the microprocessor.

A microprocessor in accordance with the present invention is constituted in a manner that in addition to the normal resetting function of re-executing a program from a predetermined address, an arbitrary data is set in advance as an address in a data register, and thereby that data is given to a program counter by a register indirect jump instruction. By adopting such a configuration, in the case where the logical level of a control signal input terminal when a reset signal at a reset terminal is cleared is in a certain state, an arbitrary data set in the data register is transferred by the register indirect jump instruction, and is set in a program counter, and the program is re-executed with that data set as an instruction start address.

The above and further objects and features of the invention will more fully be apparent from the following detailed description with accompanying drawings.

BRIEF DESCRIPTION OF THE DRAWINGS

FIG. 13 is a timing chart for explaining operation of the same.

DESCRIPTION OF THE PREFERRED EMBODIMENTS

Hereinafter, detailed description is made on the present invention based on drawings showing embodiments thereof.

Figure 1:
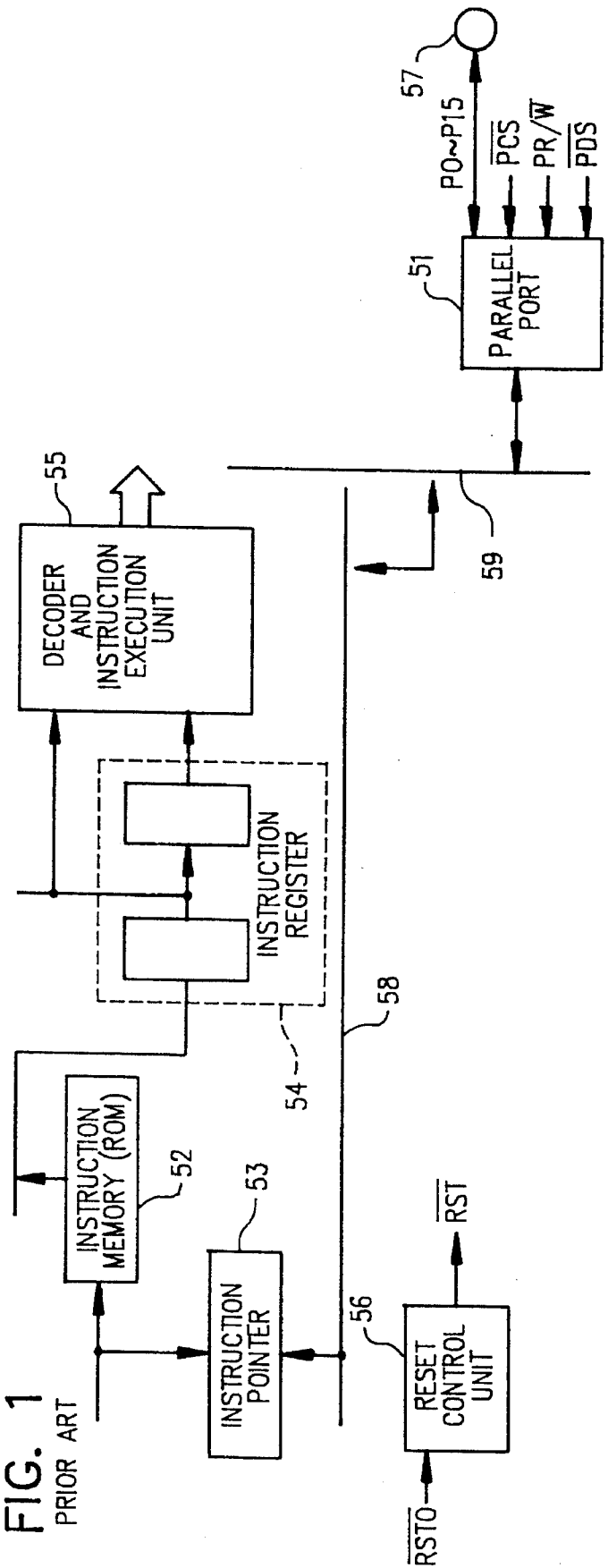
FIG. 1 is a block diagram showing a configuration of a conventional microprocessor.
Figure 2:
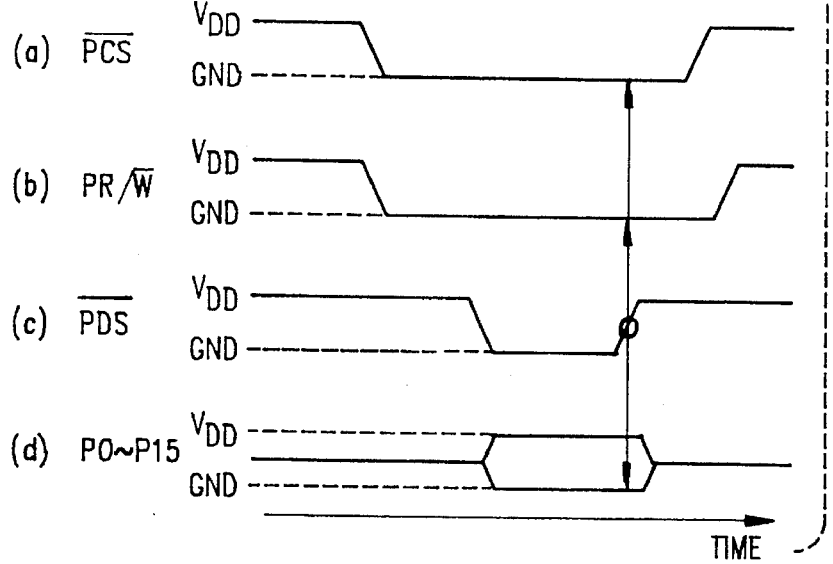
FIG. 2 is a timing chart for explaining operation of writing from exterior to a parallel port of the same.
Figure 3:
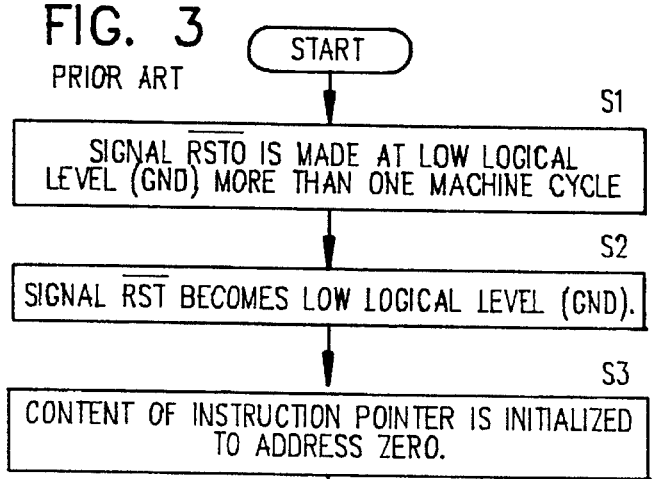
FIG. 3 is a flowchart showing a procedure of reset processing in the conventional example.
Figure 4:
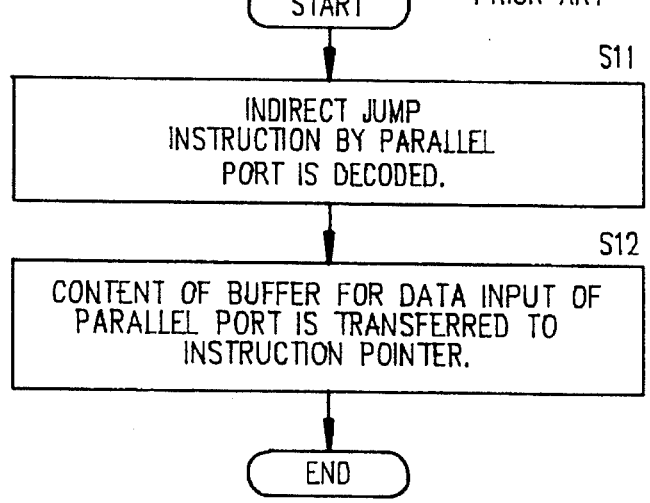
FIG. 4 is a flowchart showing a procedure of an indirect jump instruction by means of the parallel port of the convention example.
Figure 5:
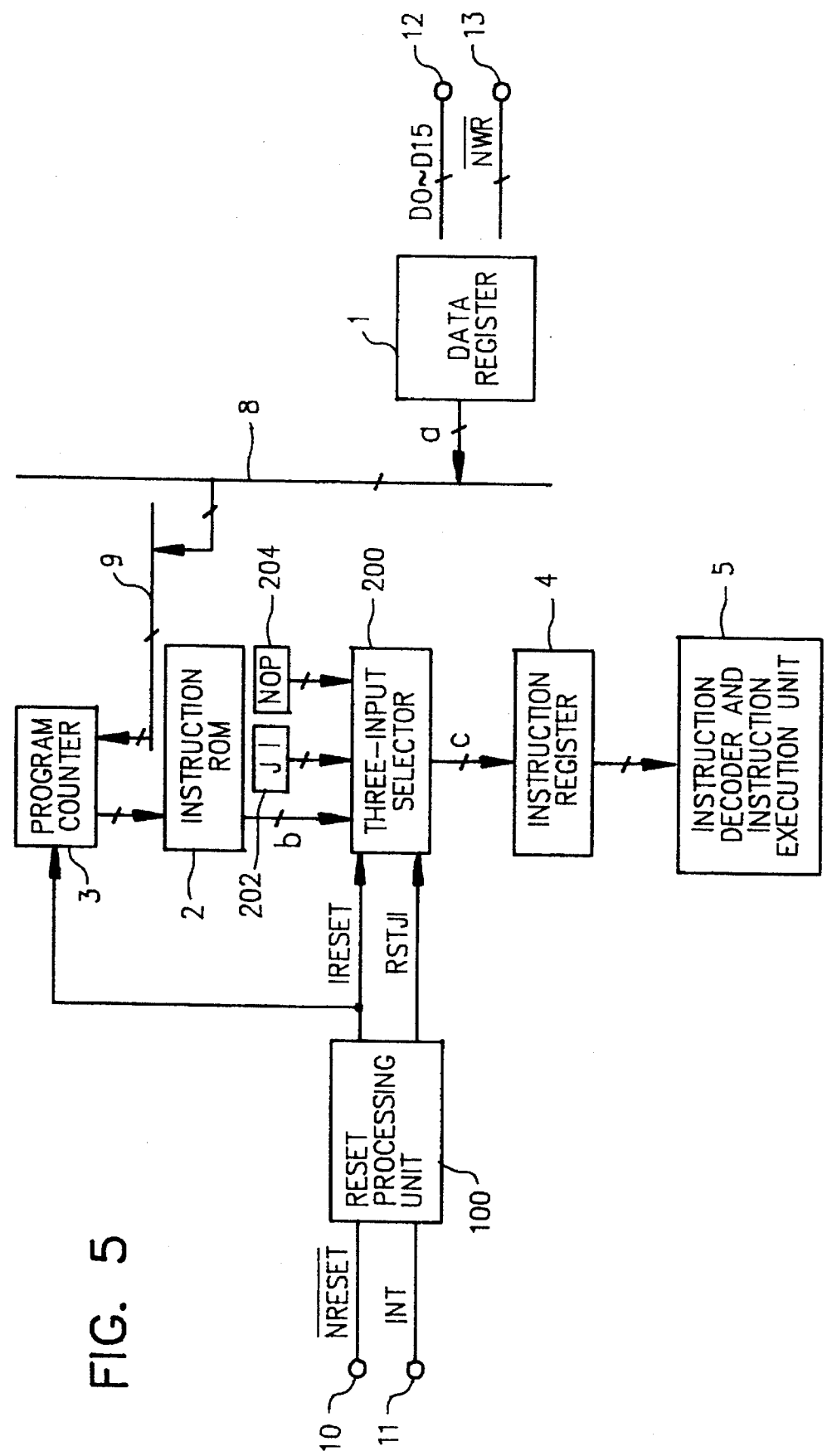
FIG. 5 is a circuit diagram showing one embodiment of a microprocessor in accordance with the present invention.

FIG. 5 is a block diagram showing a major part of one example of configuration of a microprocessor in accordance with the present invention.

In FIG. 5, numeral 1 designates a data register used for input of parallel data.

This data register 1 is provided with a parallel data input terminal 12 and a control signal input terminal 13 16 -bit parallel data input signals D0 to D15 are inputted to the parallel data input terminal 12. Also, a write control signal $\overline{NWR}$ is inputted to the control signal input terminal 13. This write control signal $\overline{NWR}$ causes data input to the data register 1 when it is of low logical level (GND).

Numeral 2 designates an instruction ROM storing instruction codes, wherein individual instructions constituting a program to be executed by the microprocessor of the present invention are stored in a form of code.

Numeral 3 designates a program counter giving an address for an instruction ROM 2, and an instruction stored in the address of the instruction ROM 2 pointed by this program counter 3 is read from the instruction ROM 2.

Numeral 4 designates an instruction register, which temporarily holds the instruction read from the instruction ROM 2.

Numeral 5 designates an instruction decoder and instruction execution unit, which decodes and executes the instruction held in the instruction register 4.

Numerals 8 and 9 designate internal buses, and the data register 1 and the program counter 3 are connected by these buses.

Numeral 100 designates a reset processing unit as a selecting means, which is provided with a reset terminal 10 and a reset select signal input terminal 11.

A reset signal $\overline{NRESET}$ is inputted to the reset terminal 10. The reset signal $\overline{NRESET}$ resets and starts the microprocessor of the present invention when it is of low logical level (GND). Also, a reset select signal INT is inputted to the reset select signal input terminal 11. The reset select signal INT is inputted to make the microprocessor of the present invention select either of two kinds of resetting operations, that is, a first reset processing as a normal resetting which re-executes an instruction from an address 0 of the instruction ROM 2 and a second reset processing capable of re-executing reset processing from an arbitrary address.

Also, the reset processing unit 100 outputs two signals of an internal reset signal IRESET and a data register indirect jump select signal RSTJI to a three-input selector 200, and outputs the internal reset signal IRESET to the program counter, respectively.

The internal reset signal IRESET, when it is of high logical level ($V_{DD}$), shows that the microprocessor of the present invention is in the reset state, resets the program counter 3 to the address 0, and makes the three-input selector 200 select a signal NOP as an input signal.

The data register indirect jump select signal RSTJI, when it is of high logical level ($V_{DD}$), makes the three-input selector 200 select a signal JI as an input signal.

A three-input selector has a first input coupled to the output of the instruction ROM 2, a second input coupled to a JI source 202, and a third input coupled to a NOP source 204. These sources may be hard-wired logic and can be included in the selector.

The three-input selector 200 selects any one of three inputs of an instruction code signal b given from the instruction ROM 2, the instruction code signal JI of the data register indirect jump instruction and the instruction code signal NOP of a no-operation instruction of performing nothing other than renewal of the program counter 3, and outputs it to the instruction register 4 as an instruction code signal c.

In addition, symbol a designates a data signal from the data register 1 to the internal bus 8.

Next, description is made on operation of the microprocessor of the present invention whose configuration is shown in FIG. 5 as described above in reference to a timing chart in FIG. 6.

Figure 6:
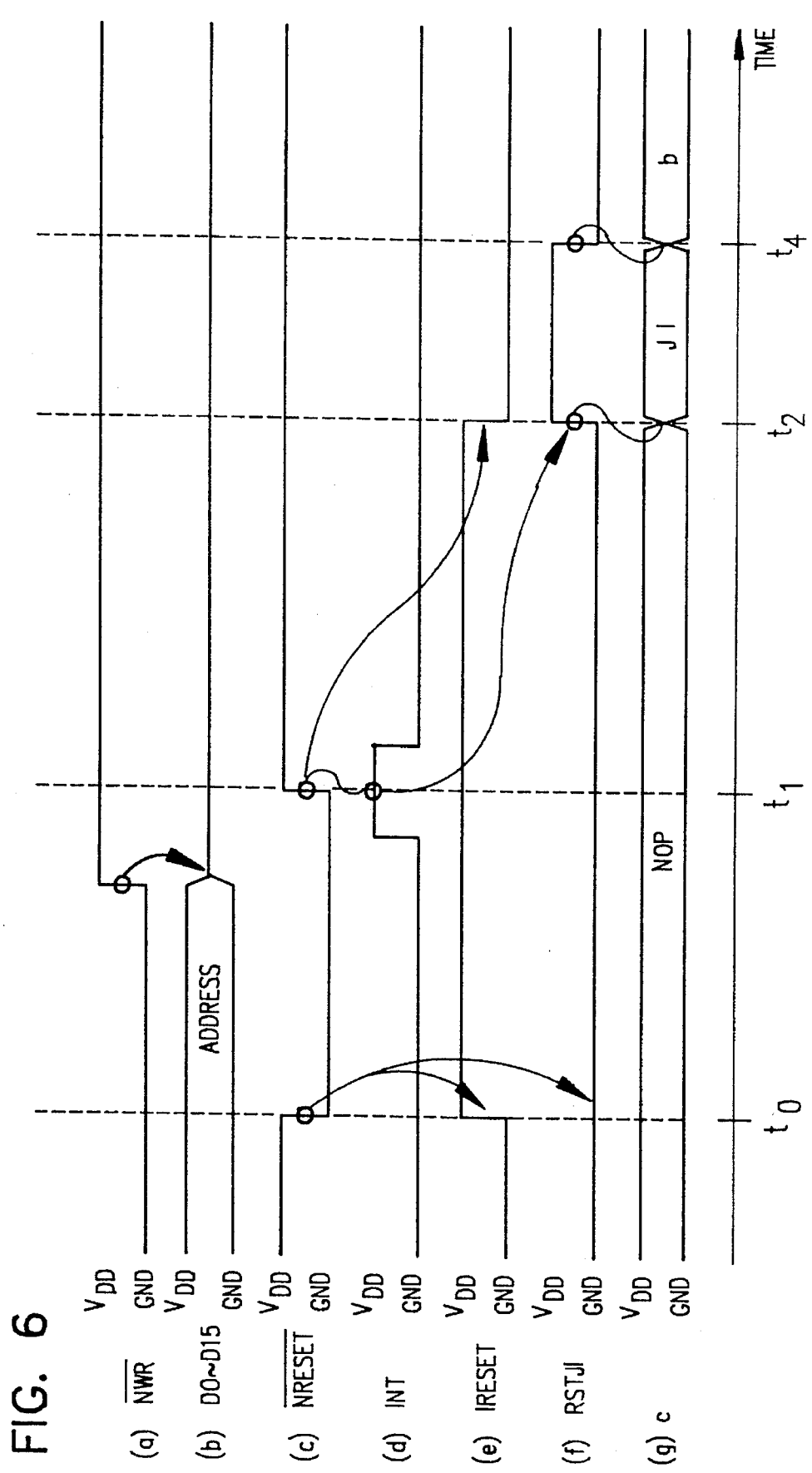
FIG. 6 is a timing chart for explaining operation of the same.

FIG. 6 shows timing charts of the data register write signal $\overline{NWR}$(a), the parallel input data signals D0 to D15 (b), the reset signal $\overline{NRESET}$ (c), the reset select signal $\overline{INT}$(d), the internal reset signal $\overline{IRESET}$ (e), the data register indirect jump select signal $\overline{RSTJI}$ (f) and the instruction register input signal c(g) respectively, in performing the second reset processing.

First, before resetting, the data register write signal $\overline{NWR}$ is turned to the low logical level (GND), and thereby the data register 1 fetches the parallel data input signals D0 to D15 through the parallel input terminal 12.

Then, at a time to, the reset signal $\overline{NRESET}$ is turned to the low logical level (GND) and the microprocessor of the present invention is put in the reset state, and thereby the reset processing unit 100 turns the internal reset signal $\overline{\text{IRESET}}$ to the high logical level ($V_{DD}$), and turns the data register indirect jump select signal RSTJI to the low logical level (GND), respectively.

Subsequently, assume that at a time t1 when the reset signal $\overline{\text{NRESET}}$ is turned to the high logical level ($V_{DD}$) and the reset signal is cleared, the reset select signal INT is held at the high logical level ($V_{DD}$), and setting of a second reset is executed.

By setting this second reset, the reset processing unit 100 turns the internal reset signal IRESET to the low logical level (GND), and holds the select signal RSTJI of the three-input selector 200 at the high logical level ($V_{DD}$) over a period from a time t2 when the internal reset is cleared to a time t4.

As described above, when the second reset is set, the reset processing unit 100 controls the three-input selector 200, and outputs the instruction code signal NOP of the no-operation instruction during resetting operation until the time t2, and thereafter during a period from the time t2 to the time t4, stores the instruction code signal JI of the data register indirect jump instruction by the data register 1 in the instruction register 4. Then, the instruction decoder 5 decodes the instructions stored in the instruction register 4, and control is performed so that the program is executed from the address according to the reset address fetched by the data register 1 before resetting.

Figure 7:
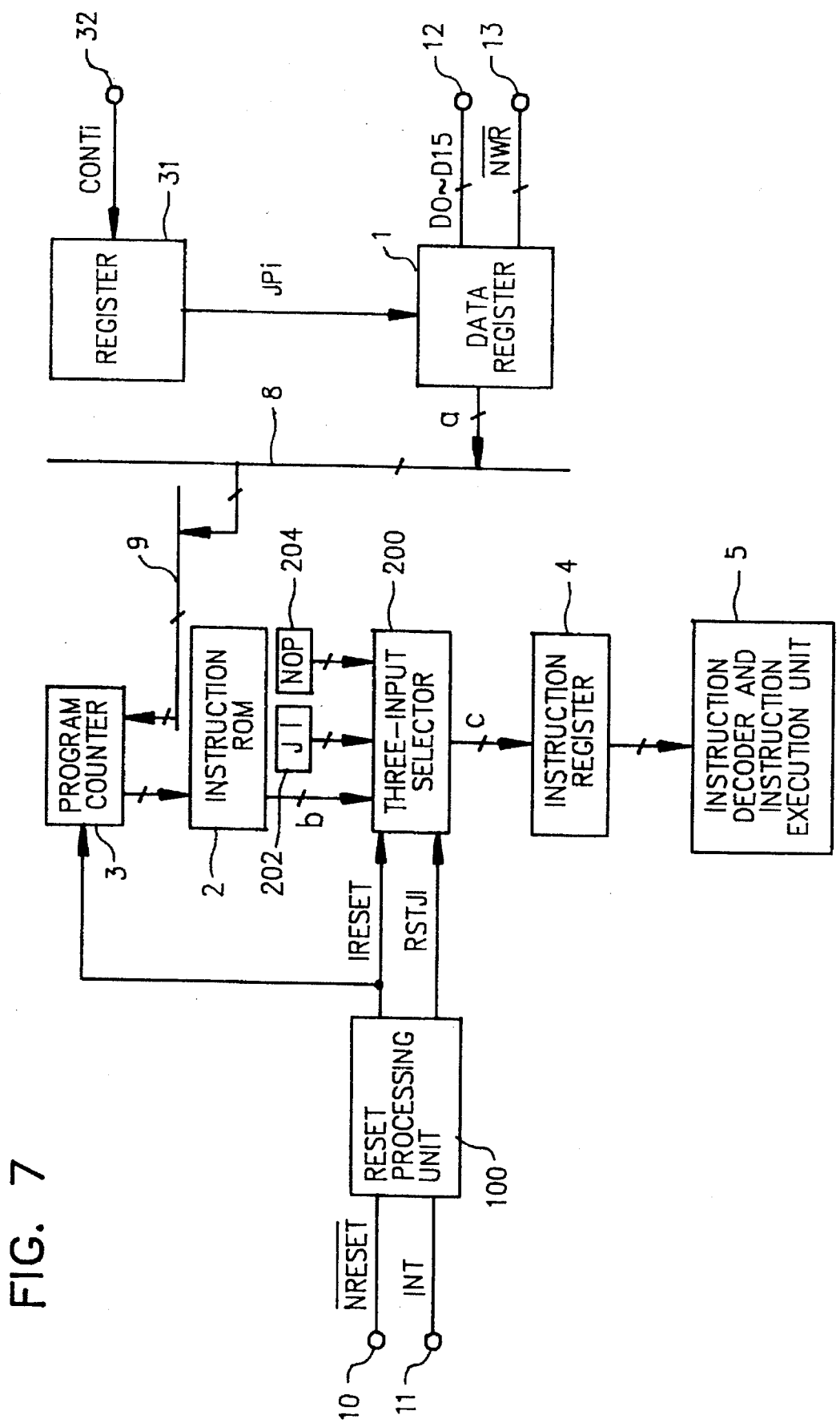
Fig. 7 is a block diagram showing a configuration of another embodiment in accordance with the present invention.

FIG. 7 is a block diagram showing another embodiment of configuration of the microprocessor of the present invention.

In this embodiment, in addition to the above-described configuration shown in FIG. 5, a register 31 is provided which stores in advance a plurality of addresses of programs to be executed at the second reset processing.

When a control signal CONTi(i=1,2...) is inputted from a control signal input terminal 32, this register 31 outputs data JPi(i=1, 2...) specifying a jump address. In the data register 1, the control signal CONTi outputted from the register 31 is inputted at a point when the data register write signal $\overline{\text{NWR}}$ is turned to the low logical level (GND). Thereafter, processing is performed like the case where the parallel data D0 to D15 are inputted to the parallel data input terminal 12 in the above-described embodiment shown in FIG. 5.

Figure 8:
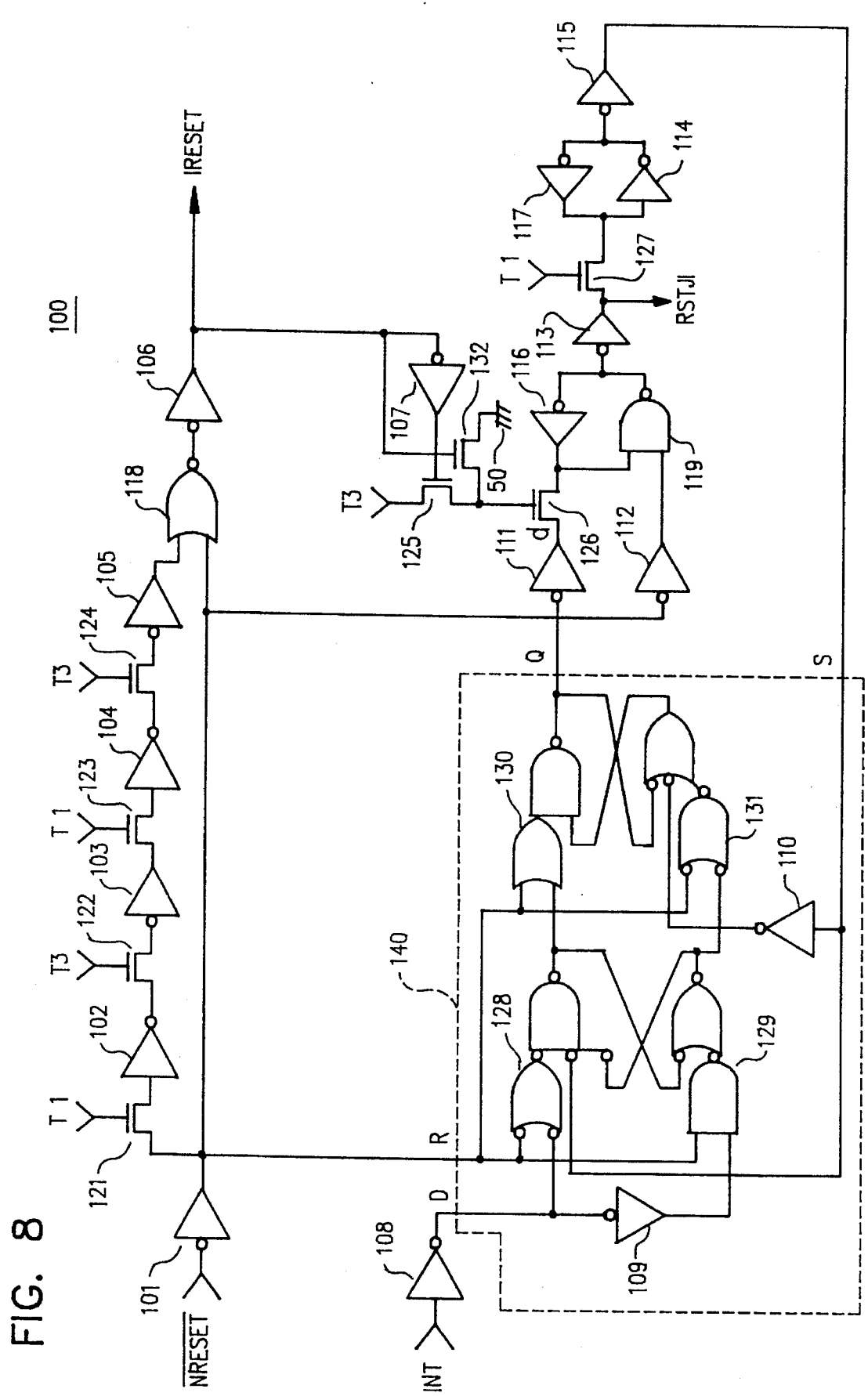
FIG. 8 is a circuit diagram in the case where a reset processing unit of the microprocessor of the present invention materialized by a MOS transistor.

Next, a logical circuit configuration in the case where the reset processing unit 100 is materialized by MOS transistor logic is shown in a circuit diagram of FIG. 8.

In FIG. 8, numerals 101 to 115, 116 and 117 designate inverters. But, the inverters 116 and 117 are small in driving ability in comparison with the inverters 101 to 115.

Numeral 118 designates a NOR gate, and numeral 119 designates a NAND gate.

Numerals 121 to 127 and 132 designate transfer gates using an N-channel-type MOS transistor, and numerals 128, 129, 130 and 131 designate logical gates respectively, which constitute a flip-flop 140.

The flip-flop 140 controls an output signal Q by means of an input signal D, a clear signal R and a set signal S. Specifically, the flip-flop 140 turns the output signal Q to the low logical level (GND) when the clear signal R is of high logical level ($V_{DD}$), and when the clear signal R is turned to the low logical level (GND), if the set signal S is of low logical level (GND), the flip-flop 140 holds the logical level of the input signal D at the output signal Q, and further when the clear signal R is of low logical level (GND), if the set signal S is of high logical level ($V_{DD}$), it turns the output signal Q to the high logical level ($V_{DD}$).

Numeral 50 designates a ground of the low logical level (GND), and symbols T1 and T3 designate internal synchronizing signals.

Next, description is made on operation of the reset control unit 100 shown in FIG. 8.

Figure 9:
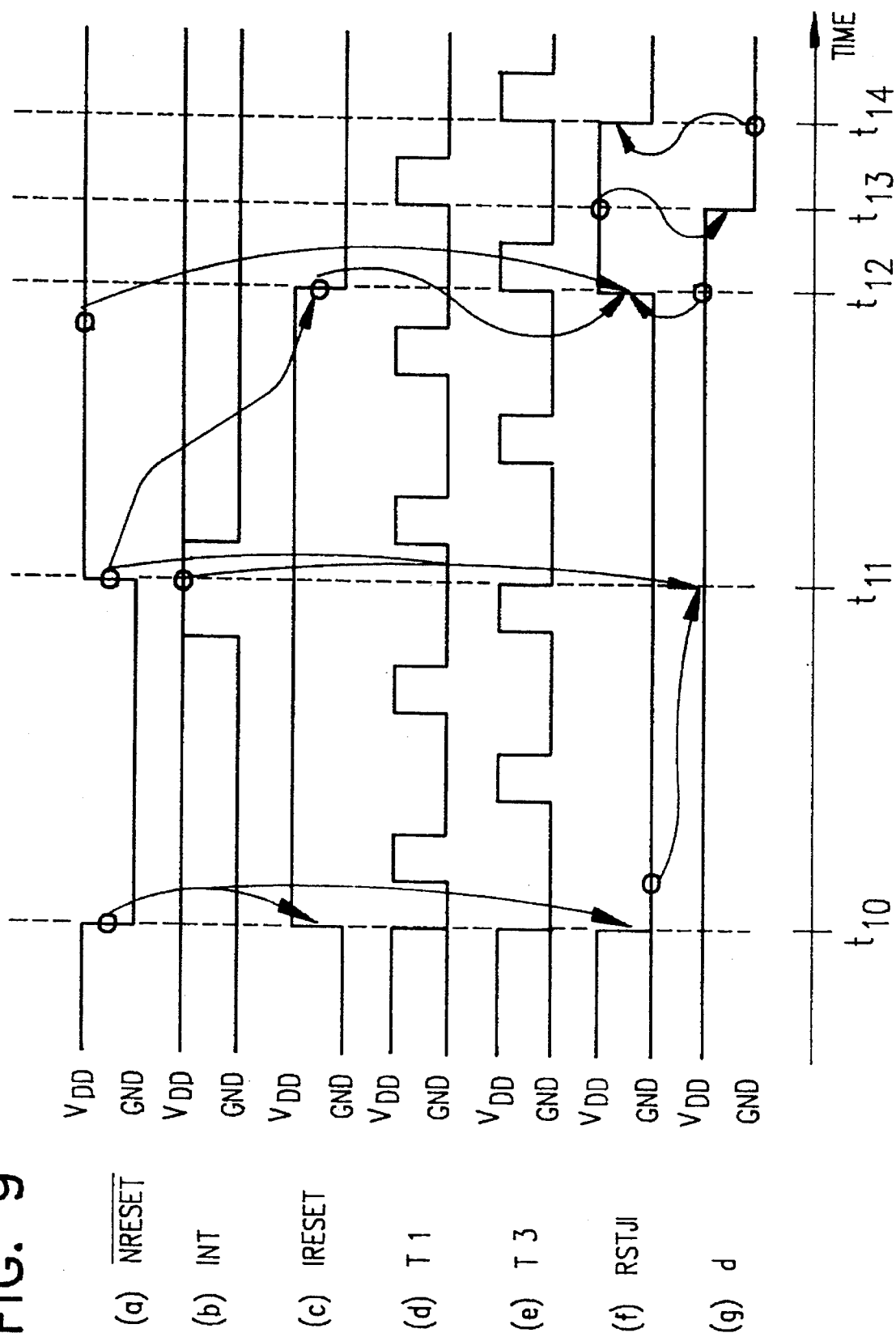
FIG. 9 is a timing chart for explaining operation of the same.

FIG. 9 shows timing charts of the reset signal $\overline{\text{NRESET}}$ (a), the reset select signal INT(b), the internal reset signal IRESET(c), the internal synchronizing signal T1(d), the other synchronizing signal T3(e), the data register indirect jump select signal RSTJI(f) and the output signal d of the inverter 111(g) in performing the second reset processing.

The inverter 101, a NOR gate 118 and the inverter 106 sequentially transmits the reset signal $\overline{\text{NRESET}}$ turned to the low logical level (GND) at a time t10, and the inverter 106 turns the output signal IRESET to the high logical level ($V_{DD}$). Also, the inverter 101, the inverter 112, a NAND gate 119, the inverter 116, and the inverter 113 transmit the reset signal $\overline{\text{NRESET}}$, and the inverter 113 turns the out-put signal RSTJI to the low logical level (GND). Further-more, when the internal synchronizing signal T1 is of high logical level ($V_{DD}$), the transfer gate 127, the inverters 114, 117 and 115 transmit the logical level of the signal RSTJI. The inverter 115 turns the set signal S of the flip-flop 140 to the low logical level (GND). Also, since the inverter 101 inverts the reset signal $\overline{\text{NRESET}}$ and turns the reset signal R to the high logical level ($V_{DD}$), the flip-flop 140 turns the output signal Q to the low logical level (GND). The inverter 111 inverts the output signal Q of the flip-flop 140 to generate the output signal d of high logical level ($V_{DD}$).

Note that when the common input signal IRESET to the gate of the transfer gate 132 and the inverter 107 is of high logical level ($V_{DD}$), the transfer gate 125 is not opened, and the transfer gate 132 is opened. As a result, the transfer gate 132 obtains the gate signal of the transfer gate 126 from a ground 50, setting it to the low logical level (GND). Consequently, the transfer gate 126 is not opened, and the transfer gate 125 does not transmit the logical level of the signal d to the NAND gate 119.

Subsequently, assume that at a time t11 when the reset signal $\overline{\text{NRESET}}$ is turned to the high logical level ($V_{DD}$), the reset processing signal INT is of high logical level ($V_{DD}$). At this time, the set signal S of the flip-flop 140 is of low logical level (GND). When the inverter 101 turns the clear signal R to the low logical level (GND), the flip-flop 140 holds the input signal D inverted to the low logical level (GND) and outputted by the inverter 108, and turns the output signal Q to the low logical level (GND). The inverter 111 inverts this output signal Q, and the inverter 111 holds the signal d at the high logical level ($V_{DD}$).

Subsequently, at a time t12, the inverter 101, the transfer gate 121, the inverter 102, the transfer gate 122, the inverter 103, the transfer gate 123, the inverter 104, the transfer gate 124 and the inverter 105 sequentially transmit the logical level of the signal $\overline{\text{NRESET}}$ turned to the high logical level ($V_{DD}$) at the time t11. Both of the inverters 101 and 105 turn the output signal to the low logical level (GND), and the NOR gate 118 and the inverter 106 sequentially transmit this signal, and the inverter 106 turns the output signal IRESET to the low logical level (GND). At this time, the common input signal IRESET to the gate of the transfer gate 132 and the inverter 107 is of low logical level (GND), and therefore the transfer gate 132 is closed and the transfer gate 125 is opened, and the transfer gate 125 transmits the internal synchronizing signal T3 to the gate signal of the transfer gate 126. Consequently, the inverter 111 transmits the logical level of the output signal d to one of the inputs of the NAND gate 119 when the internal synchronizing signal T3 is of high logical level ($V_{DD}$). Furthermore, the inverters 101 and 112 transmit the reset signal $\overline{NRESET}$, and the inverter 112 turns the output signal to the high logical level ($V_{DD}$), and therefore the input signals of the NAND gate 119 are both turned to the high logical level ($V_{DD}$). The NAND gate 119 turns the output to the low logical level (GND), and the inverter 131 inverts that signal, and turns the output signal RSTJI to the high logical level ($V_{DD}$).

Subsequently, when the internal synchronizing signal T1 is turned to the high logical level ($V_{DD}$) at a time t13, the transfer gate 127 and the inverters 114, 117 and 115 transmit the output signal RSTJI of the inverter 113. Consequently, the inverter 115 turns the output signal S to the high logical level ($V_{DD}$), and therefore the flip-flop 140 turns the output signal Q to the high logical level ($V_{DD}$). The inverter 111 inverts this signal, and therefore the inverter 111 turns the output signal d to the low logical level (GND).

Subsequently, when the internal synchronizing signal T3 is turned to the high logical level ($V_{DD}$) at a time t14, the transfer gate 125, the NAND gate 119 and the inverters 116 and 113 transmit the output signal d of the inverter 111. Thereby, the inverter 113 turns the output signal RSTJI to the low logical level (GND).

As described above, in the case where the reset select signal INT is set to the high logical level ($V_{DD}$) at the time t11 and the second reset processing is executed, the reset processing unit 100 turns the signal RSTJI controlling the three-input selector 200 to the high logical level ($V_{DD}$) to store the instruction JI required for executing the indirect jump instruction by the data register 1 over a period from the time t12 to the time t14, and turns the signal IRESET to the low logical level (GND).

Next, consideration is given on the case where normal resetting operation with the reset select signal INT held intact at the low logical level (GND), that is, the first reset processing is performed at the time t11.

In this case, when the reset signal $\overline{NRESET}$ is turned to the high logical level ($V_{DD}$) at the time t11, the input signal D of the flip-flop 140 is of high logical level ($V_{DD}$), and therefore the flip-flop 140 turns the output signal Q to the high logical level ($V_{DD}$), and the inverter 111 inverts it, turning the signal d to the low logical level. As a result, the signal RSTJI controlling the three-input selector 200 is not turned to the high logical level ($V_{DD}$), and therefore the second reset processing is not executed.

Figure 10:
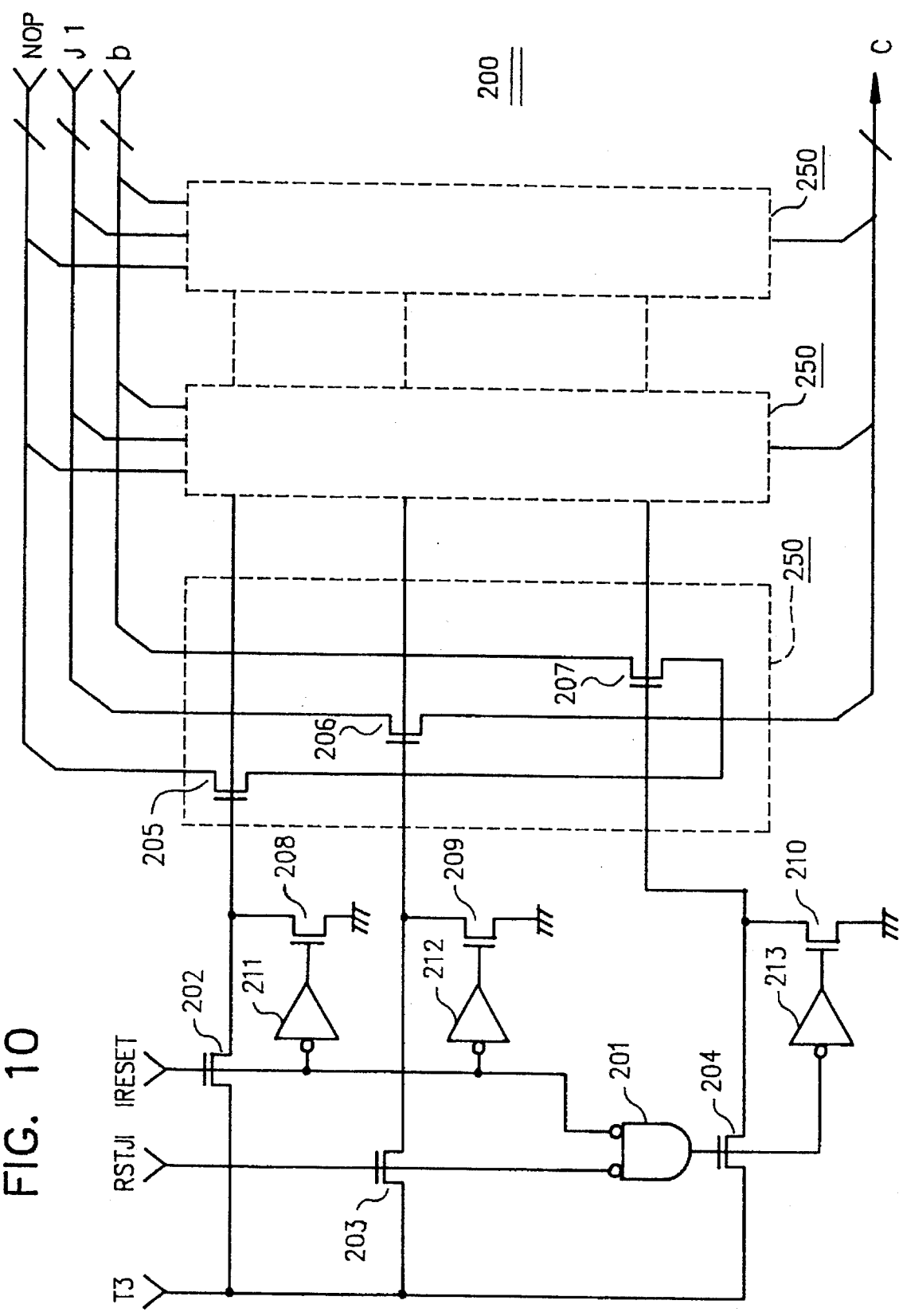
FIG. 10 is a circuit diagram in the case where a three-input selector is materialized likewise by a MOS transistor.

Next, FIG. 10 is a circuit diagram showing a logical circuit configuration in the case where the three-input selector 200 is materialized by MOS transistor logic.

In FIG. 10, numeral 201 designates a NOR gate, numerals 202 to 210 designate transfer gates using an N-channel-type MOS transistor respectively, numerals 211 to 213 designate inverters, and numeral 250 designates a selector portion of one bit of instruction code.

Next, description is made on operation of the three-input selector 200 whose configuration is shown in FIG. 10.

Figure 11:
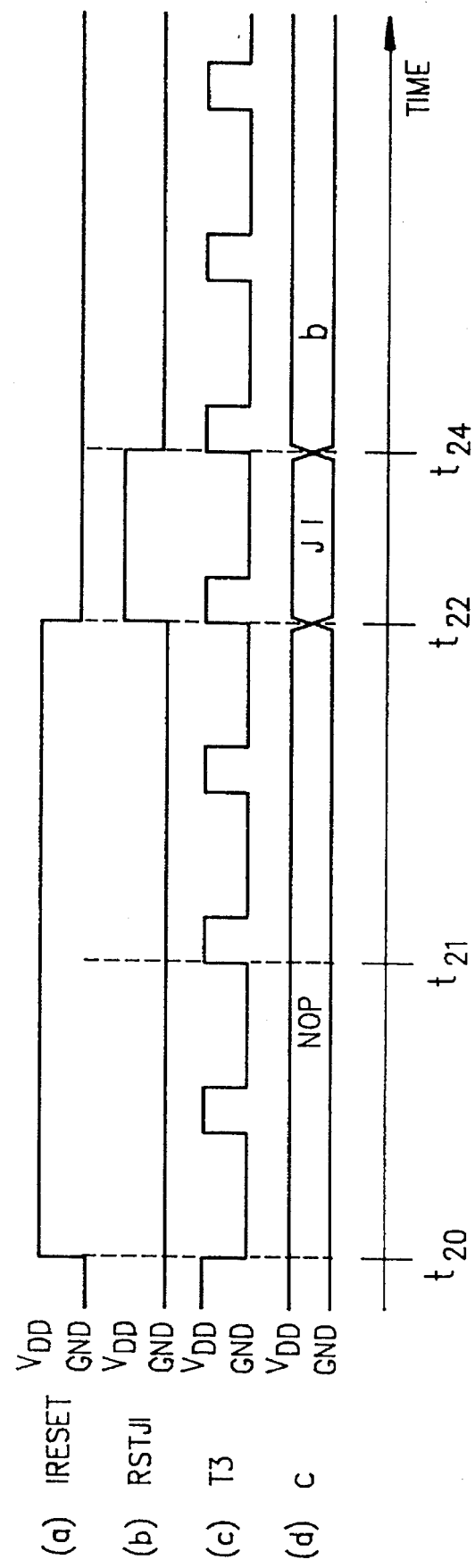
FIG. 11 is a timing chart for explaining operation of the same.

FIG. 11 shows timing charts of the internal reset signal IRESET(a), the indirect jump instruction select signal RSTJI(b), the internal synchronizing signal T3(c) and the instruction register input signal c(d) when the second reset processing is performed.

During a period from a time t20 to a time t22 wherein the internal reset signal IRESET is of high logical level ($V_{DD}$) and the indirect jump instruction select signal RSTJI is of low logical level (GND), only the transfer gate 202 among the transfer gates 202 to 204 is turned to the high logical level ($V_{DD}$), and the rest thereof are set to the low logical level (GND). Also, since one of the input signals is of high logical level ($V_{DD}$), the NOR gate 201 turns the output signal to the low logical level (GND). Consequently, the inverter 211 among the inverters 211 to 213 turns the output signal to the low logical level (GND), but the rest thereof turn the output signal to the high logical level ($V_{DD}$), and therefore only the transfer gate 208 among the transfer gates 208–210 is turned to the low logical level (GND), and the rest thereof are turned to the high logical level ($V_{DD}$).

As a result, only the transfer gate 205 among the transfer gates 205–207 is turned to the high logical level ($V_{DD}$), and the rest thereof are turned to the low logical level (GND), and therefore the three-input selector 200 outputs the instruction code signal NOP of the no-operation instruction as the output signal c.

Also, during a period from the time t22 to a time t24 wherein the internal reset signal IRESET is of low logical level (GND) and the indirect jump select signal RSTJI is of high logical level ($V_{DD}$), only the transfer gate 203 among the transfer gates 202 to 204 is turned to the high logical level ($V_{DD}$), and the rest thereof are turned to the low logical level (GND). Also, since one of the input signals is of high logical level ($V_{DD}$), the NOR gate 201 turns the output signal to the low logical level (GND). Consequently, the inverter 212 among the inverters 211 to 213 turns the output signal to the low logical level (GND), but the rest hereof turn the output signal to the high logical level ($V_{DD}$), and therefore only the transfer gate 209 among the transfer gates 208 to 210 is tuned to the low logical level (GND), and the rest thereof are turned to the high logical level ($V_{DD}$).

As a result, only the transfer gate 206 among the transfer gates 205 to 207 is turned to the high logical level ($V_{DD}$), and the rest thereof are turned to the low logical level (GND), and therefore the three-input selector 200 outputs the instruction code signal JI of the data register indirect jump instruction by the data register 1 as the output signal c.

Furthermore, after the time t24, both the internal reset signal IRESET and the indirect jump select signal RSTJI are turned to the low logical level (GND), and therefore only the transfer gate 204 among the transfer gates 202 to 204 is turned to the high logical level ($V_{DD}$), and the rest thereof are turned to the low logical level (GND). Also, since both the input signals are of low logical level (GND), the NOR gate 201 turns the output signal to the high logical level ($V_{DD}$). Consequently, the inverter 213 among the inverters 211 to 213 turns the output signal to the low logical level (GND), but the rest thereof turn the output signal to the high logical level ($V_{DD}$), and therefore only the transfer gate 210 among the transfer gates 208 to 210 is turned to the low logical level (GND), and the rest thereof are turned to the high logical level ($V_{DD}$). As a result, only the transfer gate 207 among the transfer gates 205–207 is turned to the high logical level ($V_{DD}$), and the rest thereof are turned to the low logical level (GND), and therefore the three-input selector 200 outputs the output signal b from the instruction ROM 2 as the output signal c.

Figure 12:
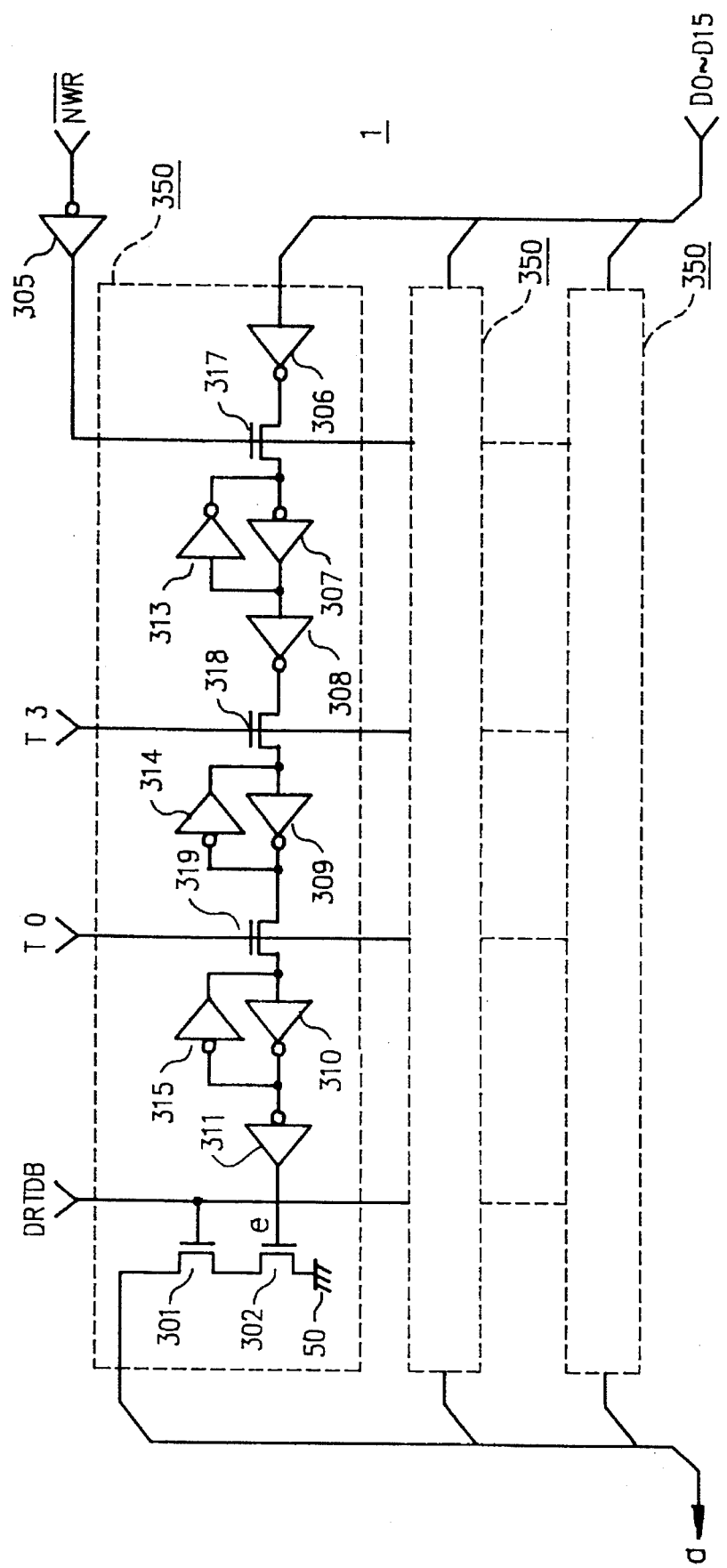
FIG. 12 is a circuit diagram in the case where a data register is materialized likewise by a MOS transistor.

Next, FIG. 12 shows a logical circuit configuration in the case where the data register 1 is materialized by MOS transistor logic.

In FIG. 12, numerals 301 and 302 designate N-channel-type MOS transistors having a small output resistance and a large driving ability. Numerals 305 to 311 and 313 to 315 designate inverters, and the inverters 313 to 315 have a driving ability smaller than that of the inverters 305 to 311. Numerals 317 to 319 designate transfer gates using an N-channel-type MOS transistor respectively. Numeral 350 designates a portion of the data register corresponding to one bit of an input parallel signal.

Next, description is made on operation of the data register 1 constituted as shown in FIG. 12.

FIG. 13 shows timing charts of the data register write signal $\overline{NWR}$ (a), the parallel input signals D0 to D15 (b), an internal synchronizing signal T0(c), another internal synchronizing signal T1(d), still another internal synchronizing signal T3(e), an output signal e of the inverter 311(f), a control signal DRTDB(g) for transmitting the contents of the data register 1 to the internal bus 8 and the data register output signal a(h).

When the write signal NWR of the data register 1 is held at the low logical level (GND), the inverter 305 sets the gate signal of the transfer gate 317 to the high logical level ($V_{DD}$), and the inverter 306 transmits the values of the parallel data input signals D0 to D15 to a latch constituted with the inverters 307 and 313 through the transfer gate 317 to hold them. Thereafter, while the internal synchronizing signals T3 and T0 are turned sequentially to the high logical level ($V_{DD}$), the output signal of the inverter 307 is transmitted through the inverter 308, the transfer gate 318, the inverters 309 and 314, the transfer gate 319, the inverters 310 and 315 and the inverter 311, and the inverter 311 gives the output signal e to the gate of the N-channel-type MOS transistor 302 as an input signal.

Thereafter, at a time t35 when the data register indirect jump instruction is executed, at a point when the control signal DRTDB for transmitting the contents of the data register 1 to the internal bus 8 is turned to the high logical level ($V_{DD}$), the output signal a is outputted to the internal bus 8 according to the logical level of the N-channel type MOS transistor 302. Then, this signal is transferred to the program counter 3 through the internal bus 9.

As described above, the address set in the data register 1 from the parallel input terminal 12 before resetting is set in the program counter 3 through the internal buses 8 and 9 when the data register indirect jump instruction is executed.

As detailed above, in accordance with the present invention, by resetting the microprocessor, the program can be re-executed from an arbitrary instruction address, and limitation to program arrangement in the instruction space is eliminated, and thus flexibility is increased in address setting.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A microprocessor comprising:

a data register which holds an arbitrary data, said data register having a data input terminal for inputting said arbitrary data to said data register;

an instruction ROM which stores a plurality of instructions constituting a program to be executed;

a program counter, different from said instruction ROM, which, when a reset signal is given, holds a predetermined address of said instruction ROM and specifies address of instructions to be executed in said instruction ROM, said program counter capable of holding any of a plurality of addresses of said instruction ROM;

an instruction register which holds the instructions to be executed;

a means for executing an unconditional register indirect jump instruction which transfers the arbitrary data held in said data register to said program counter to set said arbitrary data as the address of the instruction to be executed next;

a control signal input terminal whereto a control signal of a first or second logical level is inputted; and a selecting means, coupled to said control signal input terminal for receiving said control signal and selecting either of a first or a second resetting function, said first resetting function including setting said predetermined address as an instruction start address and said second resetting function including transferring said unconditional register indirect jump instruction to said means for executing, without receiving said register indirect jump instruction from said instruction ROM, and for executing said unconditional register indirect jump instruction to set the arbitrary data held in said data register as an instruction start address, said selecting being done in response to whether the level of said control signal input terminal at a point of time when said reset signal is cleared is the first logical level or the second logical level in the absence of execution of an instruction.

2. A microprocessor, as set forth in claim 1, further comprising a register which holds a plurality of arbitrary addresses, and gives at least one of said plurality of said arbitrary addresses to said data register in response to a signal given from exterior to be held therein.

3. A microprocessor, as set forth in claim 1, wherein said selecting means is constituted with MOS transistor logic.

4. A microprocessor, as set forth in claim 7, wherein said data register is constituted with MOS transistor logic.

5. A microprocessor comprising:

a data register for holding arbitrary data, said data register having a data input terminal for inputting said arbitrary data to said data register;

an instruction ROM for storing instructions of a program to be executed and providing an instruction at an output port in response to address data;

a program counter, different from said instruction ROM, which provides address data for selecting an instruction stored in said instruction ROM, said program counter capable of holding any of a plurality of addresses of said instruction ROM;

means, different from said instruction ROM for providing an unconditional register indirect jump instruction;

a selector, having a first input port coupled to the output port of said instruction ROM, a second input port coupled to said means for providing a register jump instruction, a control input port for receiving an externally supplied control signal, and an output port, said selector for transferring either said instruction provided by said instruction ROM at said first input port or said unconditional register indirect jump instruction provided at said second input port to said output port of said selector in response to said control signal;

an instruction register, coupled to the output port of said selector, for storing the instruction transferred by said selector; and an execution unit, coupled to said instruction register, for executing the instruction transferred by said selector so that if said unconditional register indirect jump instruction is transferred by said selector the arbitrary data held in said data register is transferred to said program counter to select an arbitrary instruction indicated by said arbitrary data and stored in said instruction ROM for execution.

6. A microprocessor comprising:

a data register for holding arbitrary data, said data register having a data input terminal for inputting said arbitrary data to said data register;

an instruction ROM for storing instructions of a program to be executed;

a program counter, different from said instruction ROM which provides address data for selecting an instruction stored in said instruction ROM, said program counter capable of holding any of a plurality of addresses of said instruction ROM;

an instruction register, coupled to said instruction ROM, for storing at least an instruction selected from said instruction ROM by said address data;

means for providing a first signal, said first signal being in a first, set state or a second, unset state;

means, coupled to receive said first signal, for providing an unconditional register jump instruction to said instruction register without using said instruction ROM when said first signal is in said set state;

an execution unit coupled to said instruction register for executing said provided unconditional register jump instruction to transfer said arbitrary data to said program counter so that an arbitrary instruction, indicated by said arbitrary data, in said program selected;

a first output port of said instruction ROM, said instruction ROM for storing processor instructions of a program to be executed and providing at least one processor instruction at said first output port;

circuitry different from said instruction ROM said circuitry having a second output port, said circuitry for providing a predetermined processor instruction at said second output port at least during a time when said at least one processor instruction is provided at said first output port;

said instruction register for receiving and storing a processor instruction at one of said first output port and said second output port; and means for selecting whether said instruction register will receive a processor instruction from said first output port or said second output port in response to a control signal.

7. A method for setting a program counter following a reset signal in a processor, comprising:

providing a data register which holds arbitrary data;

storing a plurality of instructions constituting a program in an instruction ROM;

providing a program counter which, when a reset signal is given, holds a predetermined address of said instruction ROM and specifies the address of a plurality of instructions to be executed in said instruction ROM, said program counter capable of holding any of a plurality of addresses of said instruction ROM;

providing an instruction register which holds the plurality of instructions to be executed;

providing an execution unit for executing said plurality of instructions, including at least a register indirect jump instruction which transfers the arbitrary data held in said data register to said program counter to set said arbitrary data as the address of the instruction to be executed next;

providing selecting circuitry for receiving a control signal and a first or second input and for providing said first or second input to an output in response to said control signal;

receiving said control signal in said selecting means and setting said predetermined address as said instruction start address when said control signal is in a first state and transferring a register indirect jump instruction to said means for executing, without receiving said register indirect jump instruction from said instruction ROM when said control signal is in a second state; and executing said register indirect jump instruction to set the arbitrary data held in said data register as an instruction start address.

8. A method for setting a program counter following a reset signal in a resettable processor in which the processor, following the reset, executes instructions beginning at a reset address in an instruction ROM, comprising:

providing a data register for holding arbitrary data, said data register having a data input terminal for inputting said arbitrary data to said data register;

storing a plurality of instructions constituting a program in an instruction ROM, said instruction ROM having an output port;

providing a program counter, different form said instruction ROM, which provides address data for selecting an instruction stored in said instruction ROM, said program counter capable of holding any of a plurality of addresses of said instruction ROM;

providing circuitry, different form said instruction ROM, for outputting an unconditional register indirect jump instruction;

providing a selector, having a first input port coupled to the output port of said instruction ROM, a second input port coupled to said circuitry for outputting a register indirect jump instruction, a control input port and an output port;

receiving an externally supplied control signals at said control port of said selector;

transferring either said instruction provided by said instruction ROM at said first input port of said selector or said unconditional register indirect jump instruction provided at said second input port of said selector in response to said control signals;

storing the instruction output from said output port of said register into an instruction register;

providing an execution unit, coupled to said instruction register; and executing, in said execution unit, the instruction output by said selector and stored in said instruction register so that if said unconditional register jump instruction is output by said selector, the arbitrary data held in said data register is transferred to said program counter to select an arbitrary instruction indicated by said arbitrary data and stored in said instruction ROM for execution.

9. A method for setting a program counter following a reset signal in a resettable processor in which the processor, following the reset, executes instructions beginning at a reset address in an instruction ROM, comprising:

providing a data register for holding arbitrary data, said data register having a data input terminal for inputting said arbitrary data to said data register;

storing a plurality of instructions constituting a program in an instruction ROM, said instruction ROM having an output port;

providing a program counter, different form said instruction ROM, which provides address data for selecting an instruction stored in said instruction ROM, said program counter capable of holding any of a plurality of addresses of said instruction ROM;

providing circuitry, different form said instruction ROM, for outputting an unconditional register indirect jump instruction;

providing a selector, having a first input port coupled to the output port of said instruction ROM, a second input port coupled to said circuitry for outputting a register indirect jump instruction, a control input port and an output port;

receiving an externally supplied control signals at said control port of said selector;

transferring either said instruction provided by said instruction ROM at said first input port of said selector or said unconditional register indirect jump instruction provided at said second input port of said selector in response to the state of said control signals;

storing the instruction output from said output port of said register into an instruction register;

providing an execution unit, coupled to said instruction register;

executing, in said execution unit, the instruction output by said selector and stored in said instruction register so that if said unconditional register jump instruction is output by said selector, the arbitrary data held in said data register is transferred to said program counter to select an arbitrary instruction indicated by said arbitrary data and stored in said instruction ROM for execution;

wherein said control signals includes first and second control signals, each having an active state and an inactive state; and further comprising:

performing a reset of said resettable processor when said first control signal is in an active state; and selecting said reset address based on said second control signal wherein said reset address is a single, predetermined address whenever said second signal is in said inactive state and wherein said reset address is indicated by the contents of said data register and is different from said predetermined address, when said second signal is in said active state.

10. A method, as claimed in claim 9, further comprising receiving in said data register an indication of a reset address and wherein said step of receiving in said data register occurs before said step of performing a reset.

11. A method, as claimed in claim 9, wherein said step of selecting said reset address includes moving contents of said first register into said program counter.

12. A method, as claimed in claim 11, wherein said step of moving the contents of said first register includes executing an instruction without obtaining said instruction from said instruction ROM.

* * * * *